Jan. 2, 1951  J. A. SMITH  2,536,823
DRILL SHARPENING APPARATUS
Filed Dec. 5, 1947  2 Sheets-Sheet 1
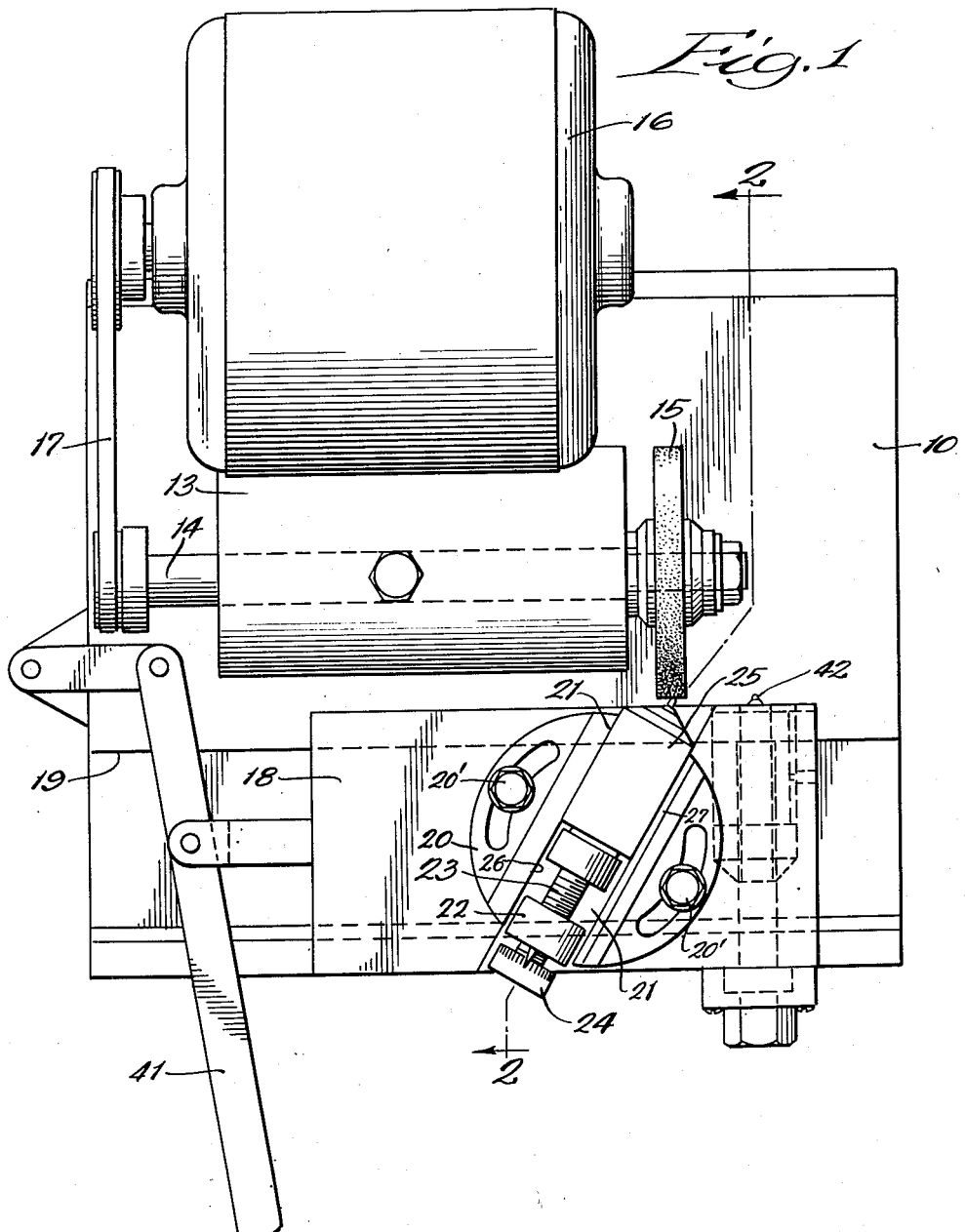
Inventor:
Jacob A. Smith,
By Dawson, Ooms, Bartlett & Spangenberg,
Attorneys.

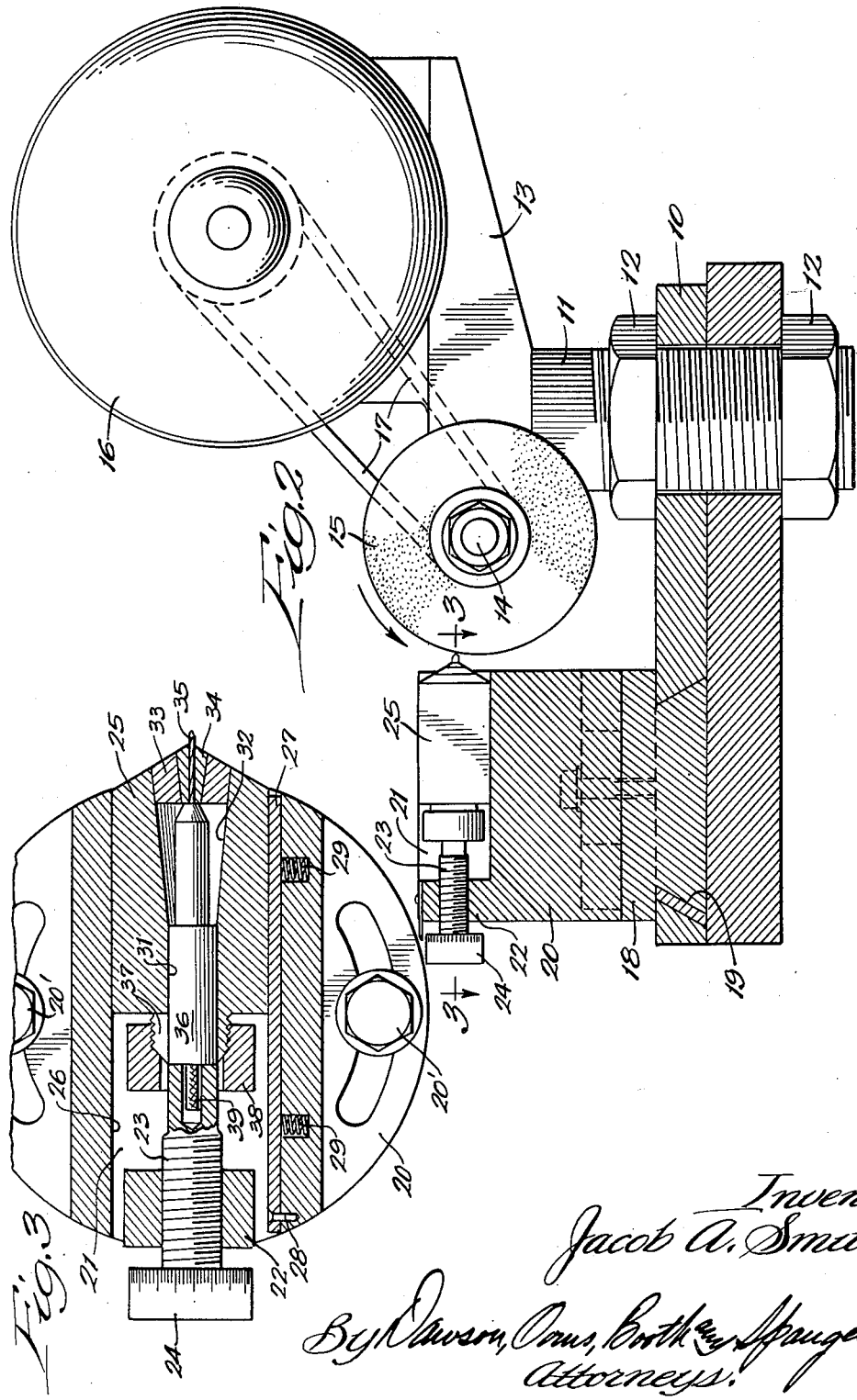

Patented Jan. 2, 1951

2,536,823

UNITED STATES PATENT OFFICE 2,536,823

DRILL SHARPENING APPARATUS

Jacob A. Smith, Chicago, Ill., assignor of one-half to Claude A. Benjamin, Chicago, Ill.

Application December 5, 1947, Serial No. 789,979

6 Claims. (Cl. 51—92)

This invention relates to drill sharpening apparatus and more particularly to apparatus for accurately sharpening small sized drills.

It has heretofore been the usual practice to sharpen drills by moving them over a wheel and turning the drills as they are moved in such a manner as to provide proper relief back of the cutting edges. This is a satisfactory procedure for sharpening relatively large drills. However, in small drills it has been found impossible to hold the drill closely enough and to control its movements accurately enough to maintain a proper balance between its cutting edges. For example, an error of .0005 inch in a number 80 drill having a diameter of .0135 inch will throw the drill out of balance approximately eight per cent while a similar error in a larger drill one-sixteenth inch or over is negligible.

It is one of the objects of the present invention to provide drill sharpening apparatus in which drills of extremely small sizes can be accurately and quickly sharpened.

Another object is to provide drill sharpening apparatus in which drills are sharpened by moving them in a rotatably fixed position across the periphery of a wheel in a path parallel to the axis of the wheel and in a plane parallel to and displaced from the wheel axis. According to one feature the cone and relief angles of the drill can be accurately controlled by regulating the angle and offset of the drill relative to the wheel axis.

Still another object is to provide drill sharpening apparatus in which the drill is held by an accurately reversible holding block so that the opposite faces of the drill can be accurately sharpened. In the preferred construction the block is resiliently pressed against an accurate locating surface and has its opposite sides accurately formed to fit selectively against the locating surface.

A further object is to provide a drill holding block in which the drill is held in a chuck and is accurately located by extending through an accurately formed opening in a locating plug. The plug is of sufficient length so that the sides of the opening therein will engage the lands on the drill sides throughout a sufficient portion of a full spiral to position the drill angularly and laterally.

The above and other objects and advantages of the invention will be more readily apparent when read in connection with the accompanying drawings, in which:

Figure 1 is a top plan view of a drill sharpening apparatus embodying the invention;

Figure 2 is a side elevation with parts in section substantially on the line 2—2 of Figure 1; and Figure 3 is an enlarged horizontal section of the drill holding and supporting mechanism.

The drill sharpening apparatus as shown comprises a base or table 10 having a post 11 extending therethrough and adjustably positioned thereon by nuts 12 threaded on the post and engaging the upper and lower surfaces of the base. By adjustment of the nuts 12 the position of the post relative to the table can be adjusted so that the spacing of its upper end above the table can be controlled.

At its upper end the post carries a fixed supporting bracket 13 on which a shaft 14 is journalled. The shaft 14 supports a grinding wheel 15 which is driven by a motor 16 carried by the support 13 and connected to the shaft 14 through a belt 17.

A drill is adapted to be supported adjacent the wheel by a support 18 which is slidable in a relatively wide key-way 19 on the base 10 for movement parallel to the axis of the shaft 14. On its upper surface the support 18 carries an angularly adjustable head 20 formed with arcuate slots through which screws 20' extend into the support 18. The head 20 is formed with a rectangular groove 21 lying at an angle to the shaft 14 with its bottom surface in a plane parallel to the shaft 14. The groove 21 is closed at one end by a threaded block 22 in which a tubular screw 23 is threaded. The screw 23 may be turned by a knob 24 which is graduated as shown in Figure 1, to indicate its adjusted position.

The forward end of the groove 21 adjacent the wheel is adapted to receive a drill holding block indicated generally at 25. The block 25 is rectangular in cross section and is of a size to fit into the groove 21 in either of two reversely rotated positions. The opposite sides of the block 25 are accurately formed and one vertical side of the groove indicated at 26 is accurately formed to provide a locating surface. One of the accurately formed sides of the block is adapted to lie against the locating surface 26 accurately to position the block in the groove. To insure proper fit of the locating surfaces on the block and groove a flexible strip 27 is secured in the opposite vertical side of the groove as by attaching it at one end as indicated at 28 to the support. Coil springs 29 recessed in the support engage the strip 27 and urge it into the groove to press the block tightly against the surface 26. With this construction the block is accurately located in the support at all times and may easily be removed from the recess and reversed for grinding the opposite faces of a drill.

To support a drill in the block during sharpening the block is formed with an opening therethrough having a substantially cylindrical portion 31 terminating at one end of the block in a conically flared end portion 32. The end portion 32 receives a conically tapered plug 33 which is in turn formed with a conical bore to receive a smaller tapered plug 34. With this construction the plugs can be accurately located in the tapered opening yet can easily be removed and replaced by different plugs. The plug 34 is formed with an accurately centered bore which is of the same diameter as the drill to be ground as indicated at 35. To change to a different size drill it is only necessary to remove the plug 34 and to replace it with a plug having a bore of the proper size.

The drill 35 is held by a small chuck 36 of the type commonly known as a pin vice. The chuck has a body portion of a size to fit relatively closely in the bore portion 31 and is formed with conventional gripping jaws to grip the drill. The chuck is held in place by a series of flexible fingers 37 extending from the end of the block 25 which are threaded on the outer surfaces to receive a tapered collar 38. When the collar is tightened the body portion of the chuck will be gripped by the fingers and held firmly in place in the block. The chuck may be operated by a reduced handle 39 projecting from the rear end thereof.

The tubular screw 23 serves to position the block and chuck axially in the recess and, as shown in Figure 3, is bored at its outer end to receive the handle 39. Thus the end of the screw abuts directly against the rear end of the chuck and serves to adjust the longitudinal position of the chuck and the drill with respect to the support.

To sharpen a drill with the apparatus of the invention, the drill is inserted in the chuck with its tip projecting a predetermined distance beyond the end of the chuck as determined by suitable gauges. The chuck is then inserted in the block and by means of a magnifying glass provided with cross hairs, not shown, is turned to the proper angular position so that its lips or cutting edges are perpendicular to the accurately formed sides of the block. The nut 38 is then tightened to clamp the chuck firmly in the block. Thereafter the block is inserted in the groove 21 with one of its accurately formed sides engaging the locating surface 26 so that the cutting edges of the drill lie in a horizontal plane parallel to but displaced from the axis of the wheel 15. The screw 23 may then be adjusted so that the desired cut on the drill tip will be made, and the support 18 may be moved along the guide way 19 parallel to the wheel axis beyond a lever 41. The tip angle can be adjusted by turning the head 20 on the support, and the desired relief is provided by the offset of the drill from the wheel axis. Thus the drill is accurately and quickly sharpened simply by moving its tip across the periphery of the wheel while holding the drill rigid relative to the support.

When one drill face has been sharpened, the block is removed and rotated through 180° so that its opposite accurately formed surface will fit against the locating surface 26. The block is slid into the recess until the end of the chuck abuts the stop screw 23 and the support is again moved across the wheel periphery. If desired, the wheel may be periodically dressed by a dressing tool 42 carried by the support. In this way the opposite faces of the drill are accurately sharpened and are maintained in perfect balance. Since no cam mechanism or other complex moving structure is required, an extremely high degree of accuracy can be produced so that drills as small as .010 inch can be sharpened with the opposite cutting faces so nearly identical that accurate drilling operations can be performed therewith. This accuracy is contributed to by the fact that the chuck serves only to locate the drill lengthwise, the lateral position of the drill being determined by the accurately formed plug 34 which has a bore of sufficient length to engage the lands of the drill through a large enough portion of a complete spiral to hold the drill with extreme accuracy.

This application is a continuation in part of my copending application Serial No. 558,297, filed October 12, 1944, now abandoned.

While one embodiment of the invention has been shown and described in detail herein, it will be understood that this is illustrative only and is not to be taken as a definition of the scope of the invention, reference being had for this purpose to the appended claims.

What is claimed is:

1. Apparatus for sharpening drills comprising a rotatable wheel, a support, guide means mounting the support for linear movement parallel to the axis of the wheel, a rectangular drill holding block, means in the block rigidly to hold a drill with its point projecting from one end of the block, the support having a rectangular opening therein to receive the block in either of two rotatably reversed positions, resilient means in the opening at one vertical side thereof to press the block horizontally against the opposite vertical side, and means to move the support parallel to the wheel axis thereby to move the point of the drill across the periphery of the wheel.

2. Apparatus for sharpening drills comprising a rotatable wheel, a support, means mounting the support for linear movement parallel to the axis of the wheel, the support having a rectangular groove in its top at an angle to the wheel axis, a rectangular holding block fitting in the groove in either of two reversed positions, resilient means at one side of the groove to press the block against the other side of the groove, jaws in the block to grip a drill, and adjustable means carried by the support adjacent one end of the groove and engageable with the block to move the block longitudinally in the groove.

3. In the apparatus for sharpening drills, a support having a rectangular groove therein defined by rigidly connected vertical sides to receive a rectangular drill holding block, a strip extending along one vertical side of the groove, and resilient means urging the strip toward the opposite vertical side of the groove.

4. In apparatus for sharpening drills, a support having a rectangular groove therein defined by rigidly connected vertical sides, one vertical side of the groove forming a locating surface, a rectangular drill holding block fitting in the groove and having a vertical side to lie against the locating surface accurately to locate the block, and resilient means on the support at the opposite side of the groove to press the block against the locating surface.

5. In apparatus for sharpening drills, a drill holding block having an opening extending longitudinally therethrough, a plug in one end of the opening having a centered bore therein of a size closely to receive a drill to be sharpened, a chuck fitting in the other end of the opening to hold a drill so that it will extend through the bore in the plug with its point projecting beyond the plug, means on the block to hold the chuck therein, a support having an opening therein to receive the block, and an adjustable abutment at one end of the opening to engage one end of the chuck thereby to position the drill longitudinally relative to the support.

6. In apparatus for sharpening drills, a drill holding block having an opening extending longitudinally therethrough, a plug in one end of the opening having a centered bore therein of a size closely to receive a drill to be sharpened, a chuck fitting in the other end of the opening to hold a drill so that it will extend through the bore in the plug with its point projecting beyond the plug, means on the block to hold the chuck therein, a support having an opening therein to receive the block, and a screw threaded in the support at one end of the opening and engageable with the end of the chuck to adjust the position of the chuck longitudinally in the opening.

JACOB A. SMITH.

REFERENCES CITED

The following references are of record in the file of this patent:

UNITED STATES PATENTS

| Number | Name | Date |
|---|---|---|
| 292,229 | Johnson | Jan. 22, 1884 |
| 893,093 | Nott | July 14, 1908 |
| 1,052,073 | Mallory | Feb. 4, 1913 |
| 1,481,260 | Hemenway | Jan. 22, 1924 |
| 1,576,311 | Des Jardins | Mar. 9, 1926 |
| 1,944,540 | Bailey | Jan. 23, 1934 |
| 1,981,174 | Hille | Nov. 20, 1934 |
| 2,080,515 | Taute | May 18, 1937 |
| 2,202,819 | Yantiss | June 4, 1940 |
| 2,363,482 | Clarke | Nov. 28, 1944 |
| 2,389,679 | Michelson | Nov. 27, 1945 |
| 2,417,116 | Lovstrom | Mar. 11, 1947 |
| 2,429,357 | Jacoby | Oct. 21, 1947 |

FOREIGN PATENTS

| Number | Country | Date |
|---|---|---|
| 135,810 | Switzerland | Dec. 16, 1929 |
| 289,980 | Italy | Nov. 3, 1931 |
| 568,414 | Great Britain | Apr. 4, 1945 |